United States Patent [19]
Meissner et al.

[11] Patent Number: 5,885,521
[45] Date of Patent: Mar. 23, 1999

[54] APPARATUS FOR RAPID REDUCTION OF IRON OXIDE IN A ROTARY HEARTH FURNACE

[75] Inventors: David C. Meissner, Charlotte; Thomas H. Boyd, Mooresville; James A. Lepinski, Charlotte; Jimmy D. Sloop, Pineville, all of N.C.

[73] Assignee: Midrex International B.V. Rotterdam, Zurich Branch, Zurich, Switzerland

[21] Appl. No.: 832,414

[22] Filed: Apr. 2, 1997

(Under 37 CFR 1.47)

Related U.S. Application Data

[62] Division of Ser. No. 357,940, Dec. 16, 1994, Pat. No. 5,730,775.

[51] Int. Cl.$^6$ .................................................. C21B 13/08
[52] U.S. Cl. ........................... 266/79; 266/92; 266/145; 266/179
[58] Field of Search ................................. 266/179, 145, 266/92, 79

[56] References Cited

U.S. PATENT DOCUMENTS

| | | | |
|---|---|---|---|
| 3,443,931 | 5/1969 | Beggs et al. | 75/33 |
| 3,452,972 | 7/1969 | Beggs | 266/20 |
| 3,836,353 | 9/1974 | Holley | 75/91 |
| 3,988,012 | 10/1976 | Jemal | 266/179 |
| 4,597,564 | 7/1986 | Hanewald et al. | 266/274 |
| 4,622,905 | 11/1986 | MacDougall et al. | 110/347 |
| 4,636,127 | 1/1987 | Olano et al. | 414/158 |
| 4,676,741 | 6/1987 | Pargeter | 432/142 |
| 4,701,214 | 10/1987 | Kaneko et al. | 266/144 |
| 5,186,741 | 2/1993 | Kotraba et al. | 75/484 |

Primary Examiner—Melvyn Andrews
Attorney, Agent, or Firm—Dougherty & Dremann

[57] ABSTRACT

A method and apparatus for producing direct reduced iron from dry compacts composed of iron oxide and carbonaceous material by feeding compacts no more than two layers deep onto a hearth and removing all the volatiles and metallizing the compacts by exposing said compacts to a radiant heat source at a temperature of from about 2400° to about 2600° F. (1316°–1427° C.) for a total time period of about four to ten minutes and partially cooling the compacts while discharging them from the hearth.

6 Claims, 4 Drawing Sheets

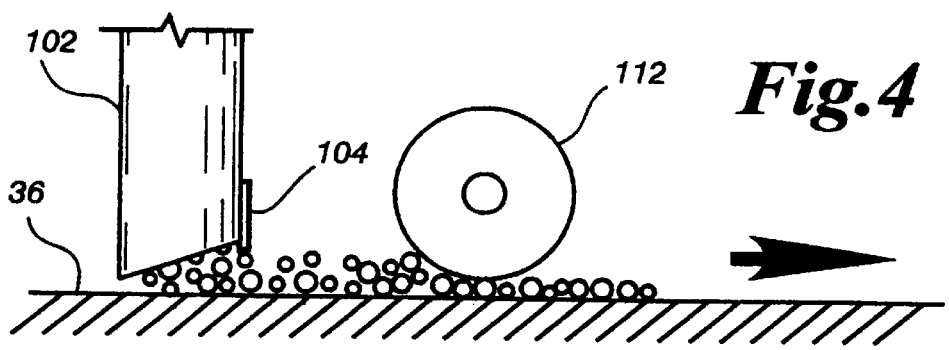
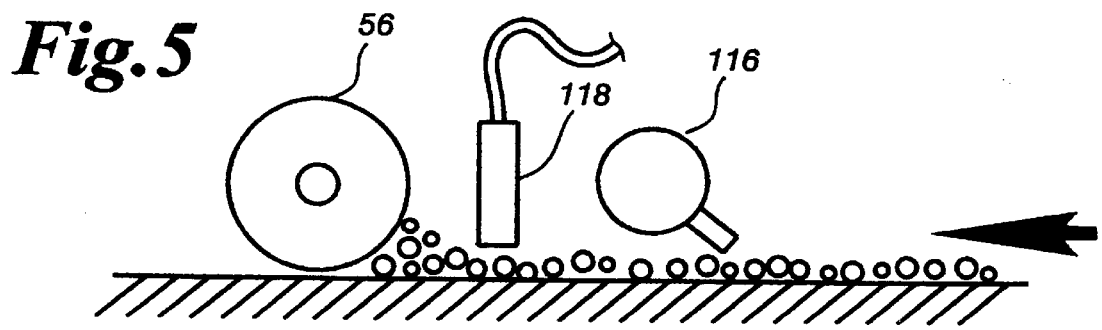

APPARATUS FOR RAPID REDUCTION OF IRON OXIDE IN A ROTARY HEARTH FURNACE

This application is a division of application Ser. No. 08/357,940, filed Dec. 16, 1994, now U.S. Pat. No. 5,730,775.

FIELD OF THE INVENTION

The present invention relates to a method and apparatus for achieving rapid and efficient reduction of iron oxide in a rotary hearth furnace.

BACKGROUND OF THE INVENTION

All previous patents and literature covering direct reduction of iron oxide in a rotary hearth (Heat Fast, Inmetco and Zia) have incorporated a low to medium temperature (below 2400° F. or 1316° C.) preheat zone in the rotary hearth furnace (hereinafter also referred to as RHF) to dry and devolatize the pellets in order to avoid pellet exfoliation. The disadvantage of this method is that it decreases productivity due to the long time required for pellets to reach optimum reduction temperature.

DESCRIPTION OF THE PRIOR ART

Applicants are aware of the following U.S. patents concerning rotary hearth furnaces used in the direct reduction of iron ore.

| U.S. Pat. No. | Inventor | Issue Date | Title |
| --- | --- | --- | --- |
| 5,186,741 | Kotraba et al. | 02-16-94 | DIRECT REDUCTION PROCESS IN A ROTARY HEARTH FURNACE |
| 4,701,214 | Kaneko et al. | 10-20-87 | METHOD OF PRODUCING IRON USING ROTARY HEARTH AND APPARATUS |
| 4,676,741 | Pargeter | 01-30-87 | RADIANTLY HEATED FURNACE |
| 4,636,127 | Olano et al. | 01-13-87 | CONVEYING SCREW FOR FURNACE |
| 4,622,905 | MacDougall et al. | 11-18-86 | FURNACING |
| 4,597,564 | Hanewald et al. | 07-01-86 | ROTARY HEARTH |
| 3,836,353 | Holley | 09-17-74 | PELLET RECLAMATION PROCESS |
| 3,452,972 | Beggs | 07-01-69 | FURNACE HEARTH |
| 3,443,931 | Beggs et al. | 05-13-69 | PROCESS FOR MAKING METALLIZED PELLETS FROM IRON OXIDE CONTAINING MATERIAL |

Beggs U.S. Pat. No. 3,443,931, teaches a method of metallizing compacts of iron oxide containing a carbonaceous material. The compacts are formed, dried, and pre-indurated up to a temperature between 1600°–1800° F. The pellets are then rapidly heated by exposure to a radiant heat source which produces an environment at a temperature between 2300°–2600° F. for a sufficient time so that a liquidus phase is formed within the compacts. After the liquidus phase is formed, the compacts tend to shrink and then are immediately chilled by exposure to a cold environment.

Beggs U.S. Pat. No. 3,452,972, teaches apparatus for a refractory furnace hearth having wustite (FeO) as a constituent thereof and the method of making such a refractory hearth. The subject furnace hearth has particular utility in the processing of iron oxide containing material, and is able to support such material during the reduction thereof without being destroyed during the process.

Holley U.S. Pat. No. 3,836,353, teaches a method of recovering iron and oxide impurities from steel furnace dust in which the dust first is mixed with finely divided coke and then this mixture is pelletized. The green pellets thus formed are deposited over a layer of burnt pellets on a rotary hearth which successively conveys the pellets first through a drying zone, then through an initial heating zone in which the pellets are gradually raised to a temperature at which the coke starts to burn, then through a decontamination zone in which the pellet temperature is rapidly raised to a degree at which zinc, lead and sulfur impurities vaporize and in which these impurities are carried off and collected as oxides, and finally the pellets are carried through a reoxidation and hardening zone in which the temperature thereof is further increased to a sufficient degree and held for a long enough period of time to permit the growth of grains of an oxide of iron on the surface of the pellets, thus to form hard bonded pellets which are not fused together.

Hanewald et al. U.S. Pat. No. 4,597,564, teaches a rotary hearth adapted to rotate in horizontal plane having a top surface made of a loose granular refractory material, advantageously dead burned dolomite grain.

MacDougall et al. U.S. Pat. No. 4,622,905, teaches an improvement in furnacing objects on the top surface of an impervious rotating hearth in a directly fired rotary hearth furnace by the use of fuel burning with a luminous flame e.g., coal.

Olano et al. U.S. Pat. No. 4,636,127, teaches a countercurrent fluid cooled conveying screw is disclosed. Suitable for furnace applications, the screw includes an outer shaft spatially circumscribing an inner tube. A plurality of hollow, fluid cooled flights are affixed to the outer shaft and are in fluid flow communication with coolant coursing through the screw. The coolant is first directed through the flights and then back through the outer shaft before exiting through the inner tube.

Pargeter U.S. Pat. No. 4,676,741, teaches a radiantly heated, traveling hearth furnace having a supplementary feed means positioned intermediate the initial loading point and the final take-off point to increase the capacity of the furnace for treating objects fed thereto. When the objects are pellets of iron oxide and carbonaceous reductant the provision of supplementary feed means about half-way along the travel path of the hearth promotes uniformity of product by inhibition of reoxidation of reduced iron by exposure to a fossil-fuel-fired furnace atmosphere.

Kaneko et al. U.S. Pat. No. 4,701,214, teaches a method of producing iron from finely divided iron oxide comprising the steps of: mixing iron oxide or iron ore fines with finely divided coal and a binder to form a mixture, agglomerating the mixture by compacting, pelletizing, or briquetting the mixture to form agglomerates or pellets, introducing the pellets to a rotary hearth furnace to pre-reduce the iron in the pellets, introducing the pre-reduced pellets into a smelting reduction vessel as the metallic charge constituent, introducing particulate carbonaceous fuel and oxygen to the smelting reduction vessel through the bottom of the vessel to react with the melt or bath within the vessel, reduce the iron to elemental iron and form an off gas containing CO and $H_2$, introducing the off-gas into the rotary hearth furnace as process gas to pre-reduce the pellets therein, and drawing off the hot metal from the smelting reduction vessel.

The pre-reduced compacts are preferably discharged from the rotary hearth furnace at a temperature of at least 1000° C. into the smelting reduction vessel to form the molten iron product.

Kotraba et al. U.S. Pat. No. 5,186,741, teaches a pellet reclamation process includes forming green pellets of a mixture of steel furnace dust, a carbonaceous material such as coal, charcoal, lignite, petroleum coke, or coke, and an organic binder. The green pellets are fed over a layer of burnt pellets on a rotary hearth furnace which successively conveys the pellets first through a drying and coking zone in which the pellets are dried and any volatile matter driven out of the carbonaceous material. The pellets then travel through a reduction zone where the pellets are subjected to a higher temperature at which the contained iron oxide is reduced and remains within the pellets and the zinc, lead and cadmium oxides are reduced, volatilized, re-oxidized and carried off as oxides in the waste gases. The reduced pellets (DRI) are ultimately carried into a discharge zone where they are discharged from the rotary hearth furnace. An apparatus for performing the process is also disclosed.

SUMMARY OF THE INVENTION

This invention provides an improved method and apparatus for achieving rapid and efficient reduction of iron oxide in a rotary hearth furnace. Test results with this process, which will be known by the trade name or trademark FASTMET™, show that properly formed pellets (dry compacts) can be exposed immediately to a radiant heat source with a temperature of 2400°–2600° F. (1316°–1427° C.) without causing exfoliation. Eliminating the low to medium temperature preheat zone and operating at high reduction temperature increases hearth productivity by 30 to 100% compared to other processes. In addition, energy efficiency can be improved by burning most of the volatiles released from the compacts inside the rotary furnace, and causing the compacts and products of combustion to flow co-currently in the first portion of the furnace and counter-currently in the second portion of the furnace.

OBJECTS OF THE INVENTION

The principal object of the present invention is to provide an improved method of achieving rapid and efficient reduction of iron oxide in a rotary hearth furnace.

It is also an object of this invention to provide means for dividing rotary hearth gas flow into two portions rather than having the gas accumulate and peak at the feed area where dust is most likely to be entrained.

Another object of the invention is to provide a low roof height in the initial heating zone of a rotary hearth furnace to enhance the radiative heat transfer to a layer of compacts on the hearth.

Another object of the invention is to provide a rotary hearth furnace apparatus where the volatiles released from the compacts have a longer retention time, and can be more readily combusted.

Another object of the invention is to provide a rotary hearth furnace with more efficient combustion than previously available, resulting in a lower ultimate gas volume requiring gas cleaning.

A further object of the invention is to provide a rotary hearth furnace where the direction of the flue gas at the outlet is away from the hearth rather than sweeping across the hearth toward the side wall.

Another object of the invention is to provide a rotary hearth furnace with a flue gas outlet of sufficient size to slow the gas velocity allowing entrained particles to fall back onto the hearth by gravity.

A further object of the invention is to provide a rotary hearth furnace with improved atmosphere control at the hearth level to avoid oxidation of metallic iron.

Another object of the invention is to provide a rotary hearth furnace apparatus for producing highly metallized iron having lower carbon content.

Another object of the invention is to provide an improved rotary hearth furnace in which energy efficiency is improved by using sensible heat in the metallized compacts to preheat part of the fuel for the rotary hearth furnace.

A further object of the invention is to provide a rotary hearth furnace capable of operating with a very short retention time of 4 to 10 minutes.

Another object of the invention is to provide a rotary hearth furnace which avoids any disturbance of the protective blanket of carbon monoxide being evolved from the compacts in the final stages of reduction.

Another object of the invention is to provide a rotary hearth furnace which maintains at least 1 percent excess carbon in the metallized compacts.

BRIEF DESCRIPTION OF THE DRAWINGS

The foregoing and other objects will become more readily apparent by referring to the following detailed description and the appended drawings in which:

FIG. 4 is a schematic side view of the feed apparatus showing the feed or pellet leveler.

FIG. 5 is a schematic side view of the discharge portion of the apparatus showing a cooling device.

DETAILED DESCRIPTION

Figure 1:
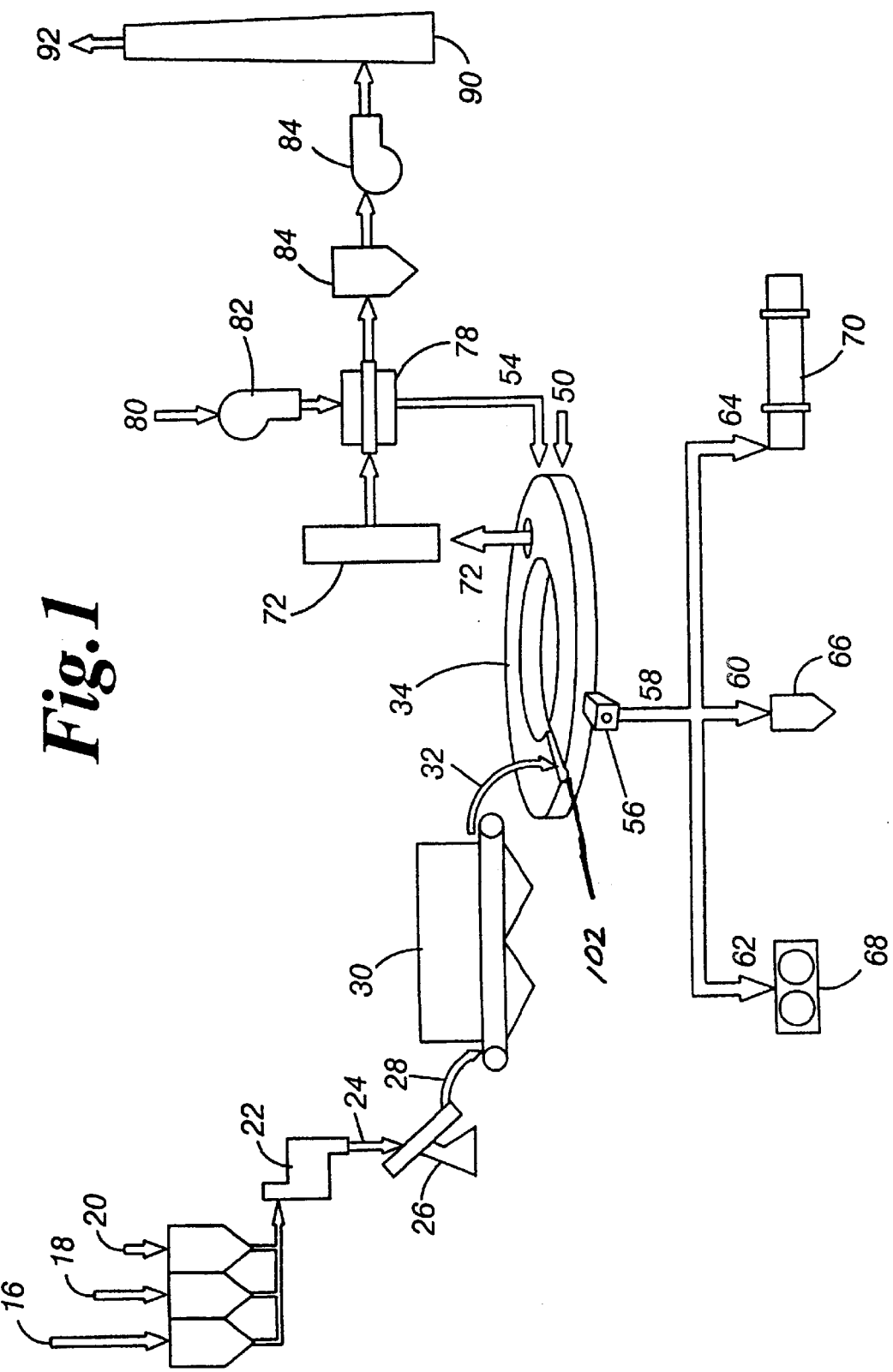
FIG. 1 is a schematic diagram of the process for an improved method of achieving rapid and efficient reduction of iron oxide in a rotary hearth furnace.

Referring now to the drawings, and particularly to FIG. 1, the invented method and apparatus for achieving rapid and efficient reduction of iron oxide in a rotary hearth furnace includes feed bins 10, 12 and 14 which contain the raw materials for the process. Feed Bin 10 contains iron oxide materials 16 which are comprised of, but not limited to, finely divided iron ore fines, concentrate, by-product iron oxide and steel mill waste. Feed Bin 12 contains carbonaceous materials 18 which are comprised of, but not limited to, pulverized coal, coke breeze, char, anthracite, charcoal and petroleum coke. Feed Bin 14 contains binder materials 20 which are comprised of, but not limited to, organic binders, bentonite, or hydrated lime.

Materials from the feed bins 10, 12 and 14 are mixed together in proper proportions, in a mixing unit 22. This mixture 24 is sent to an agglomerating unit 26 which either pelletizes, briquettes, extrudes or compacts mixture 24 into consolidated units 28 which are then transported to a drying unit 30 and dried at approximately 250° F. (about 121° C.) to remove moisture.

Figure 2:
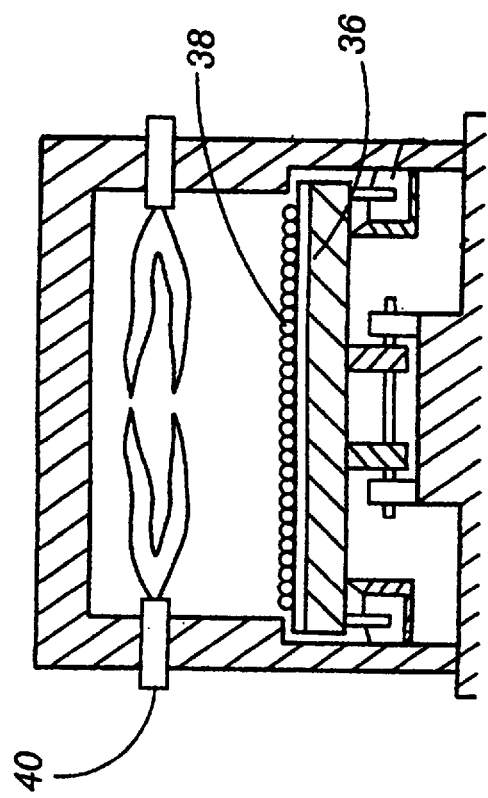
FIG. 2 is a cross sectional view of the improved rotary hearth furnace.
Figure 3:
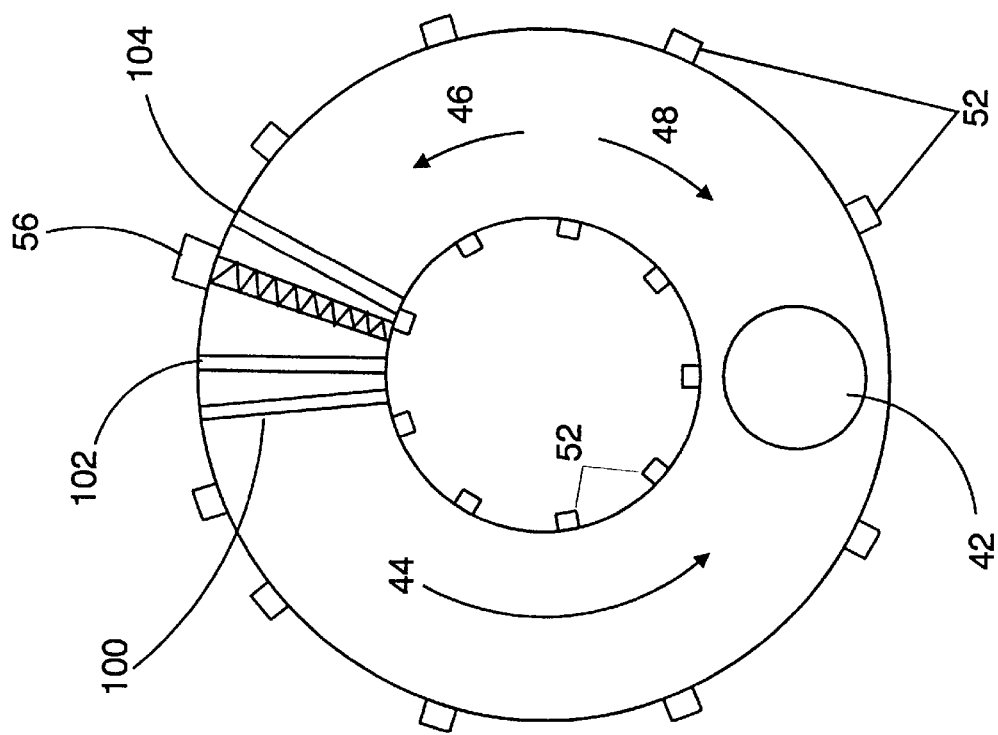
FIG. 3 is a top view of the improved rotary hearth furnace.

The dry compacts 32 are fed into a rotary hearth furnace (RHF) 34 through a vertical feed pipe 102 and deposited on the solid hearth 36, FIG. 2, in a layer 38 one to two compacts deep, the height of which is controlled by leveler 104. The compacts pass under a radiation barrier 100 and are exposed to a radiant heat source 40 of 2400°–2600° F. (1316°–1427° C.) for a period of 4 to 10 minutes during which time the volatiles and carbon monoxide are evolved from the compacts and combusted inside the furnace and most of the iron oxide is reduced to metallic iron and iron carbide.

As shown in FIG. 4, the compacts 38 are fed one to two layers deep onto the hearth from the vertical feed pipe 102, which includes the leveler 104, or adjustable gate, having a lower edge to control the thickness of the layer of compacts.

The impact of rapid heating and high reduction temperature on the reduction rate of dry compacts 28 containing a mixture of iron oxide and carbonaceous material can be seen in the following table. The tests were conducted in an electrically heated tube furnace having a nitrogen atmosphere. The dry compacts (made with a mixture of magnetite concentrate, low-volatile bituminous coal and binder), were placed inside the preheated tube furnace and removed at 2 minute intervals and analyzed for total and metallic iron to develop a metallization (percent of total iron content in the form of metallic iron) versus time curve.

| Radiant Heat Source Temperature (°F.) | (°C.) | Time to Reach 93% Metallization (in minutes) |
| --- | --- | --- |
| 2150 | 1177 | More than 10 |
| 2250 | 1232 | 7.6 |
| 2350 | 1288 | 6.4 |
| 2450 | 1343 | 5.8 |

The productivity (lb/h-ft$^2$) in a rotary hearth furnace 34 for a given feed material and hearth loading is inversely proportional to the retention time. For example, a retention time of 5.8 minutes should result in a productivity 31% higher than a retention time of 7.6 minutes.

The impact of rapid heating in an oxygen rich atmosphere on the reduction rate of dry compacts containing a mixture of iron oxide 16 and carbonaceous material 18 was determined by comparing results of one test conducted in a nitrogen atmosphere and a second test conducted in an air atmosphere for the first 2 minutes followed by a nitrogen atmosphere for the remaining time. The same test procedures were used as mentioned above. The radiant heat source temperature was kept constant at 2450° F. (1343° C.) in both tests. Results were similar when using dry compacts made with a mixture of hematite concentrate, low-volatile bituminous coal and binder.

Since the temperature is kept uniformly high throughout all the heating zones of the furnace, it is not necessary to locate the flue duct near the feed end to take advantage of the sensible heat of the products of combustion. The flue gas temperature would be approximately the same regardless of outlet location 42 on the RHF 34. Therefore, it is possible to improve fuel efficiency, when using carbonaceous materials containing volatiles, by locating the flue gas outlet 42 at the mid-section of the RHF 34, between the charging and discharging locations. This results in the compacts and products of combustion flowing co-currently in the first portion 44 of the RHF and counter-currently in the second portion 46 of the RHF.

The gas flow through the RHF 34 is divided into two portions 44 and 48 rather than growing cumulatively and peaking at the feed area 102 of the RHF where dust is most likely to be entrained. This allows the height of the roof in the initial heating zone in the RHF 34 to be low due to the passage of low gas volume through the zone, thus enhancing the radiative heat transfer to the layer of compacts. Volatiles released from the compacts have a longer retention time inside the RHF and can be more readily combusted. The more efficient combustion inside the RHF lowers the ultimate volume of gas requiring gas cleaning.

Locating the flue gas outlet 42 in the roof of the RHF 34 provides additional advantages like the direction of the flue gas at the outlet is away from the hearth rather than sweeping across the hearth toward the side wall. The flue gas outlet 42 can be made sufficiently large in diameter to slow the gas velocity down, allowing entrained particles to fall back onto the hearth by gravity.

The high temperature radiant heat source 40 is initially generated by burning fuel. Burner fuel is provided from a source 50, the fuels used are comprised, but not limited to natural gas, fuel oil, by-product gas and pulverized coal. This fuel is distributed to through roof burners or wall mounted burners 52. Oxygen for combustion is supplied by preheated 54 or oxygen enriched air. Additional preheated or oxygen enriched air is supplied to burn volatiles and CO evolved from the compacts. Efficient combustion is achieved due to the high operating temperature, and the longer retention time of volatiles and carbon monoxide inside the furnace due to locating the flue gas outlet 42 at the mid-section of the RHF 34 instead of at the feed end of the RHF.

Operating with an oxidizing atmosphere and high temperature in the early stage of heating and reduction causes the volatiles to ignite on or near the surface of the dry compacts forming a radiant flame which enhances the heat transfer to the compacts.

In the final stage of reduction, the atmosphere maintained inside the furnace is overall oxidizing to metallic iron. This allows the burners to operate more efficiently, resulting in lower fuel consumption and the flexibility to use fuels such as pulverized coal and fuel oil. The reduced iron is protected from oxidation by: operating with a very short retention time of 4 to 10 minutes; avoiding disturbance of the protective blanket of carbon monoxide being evolved from the compacts in the final stages of reduction; and maintaining at least 1 percent excess carbon in the metallized compacts.

One method of partially cooling the metallized compacts is injecting a coolant from injector 116 on, or near, the compacts immediately prior to their, discharge from the rotary hearth furnace. This coolant can comprise natural gas, pulverized coal, fuel oil or by-product gas. The coolant will dissociate into carbon and hydrogen. Some, or all, of the carbon may form carbon monoxide by reacting with carbon dioxide and water vapor. Free carbon deposited on the surface of the compacts will add further protection from oxidation. Reformed gases, carbon monoxide and hydrogen, provide additional blanket protection from the oxidizing products of combustion above the compacts. The dissociation and reforming of the coolant partially cools the hot compacts, transferring the heat to the reformed gases which are allowed to flow upward in the rotary hearth furnace 34 and are combusted.

The advantages of this method are: improved atmosphere control at the hearth level to avoid oxidation of metallic iron; highly metallized iron can be produced having lower carbon content; energy efficiency is improved by using sensible heat in the metallized compacts to preheat part of the fuel for the rotary hearth furnace.

To assist in optimizing productivity and monitoring product quality, a water cooled gas sampling probe 118 is installed inside the rotary hearth furnace to collect gas samples less than one inch above the surface of the compacts just prior to discharge. As the metallization level of the compacts approaches 90 to 95%, the rate of reduction begins to slow and the amount of carbon monoxide evolved begins to decrease. By monitoring the carbon monoxide and oxygen content of the gas at this location, it is possible to predict product quality prior to obtaining chemical analyses of the product. A high carbon monoxide level indicates the reduction rate is still high and product metallization may be low. A medium level of carbon monoxide indicates the reduction rate has slowed and product metallization is high. A low carbon monoxide level and/or presence of oxygen indicates the reduction rate has stopped and the product may be oxidized. Based on this knowledge, adjustments can be made to hearth speed, loading, temperature and/or atmosphere as necessary to maintain optimum productivity and product quality. The specific level of carbon monoxide and oxygen for the above three conditions must be calibrated for each furnace condition and feed mix.

The metallized compacts are discharged from the hearth 36 via one or more helical water-cooled screws 56. The discharge device also levels the hearth. The hearth 36 is solid, is made of about 4 inches of the material being processed, and has wustite as a major constituent thereof. In this regard, it is a self-healing hearth. Any cracks or pits which develop are automatically filled with fresh fines without concern for buckling of the refractory underneath.

The temperature of the discharged product 58 is approximately 1650° to 2200° F. (899° to 1204° C.). The product 58 can be hot charged into a melter 60, hot briquetted 62, or cooled 64 and stockpiled. If the discharge product is sent to a melter 60, then it may end up in a transfer can 66 as hot direct reduction iron. It may also be desirable to sent discharge product 58 to a briquetting press 68 for formation of hot briquette iron. Alternatively discharged product 58 can be sent to a rotary drum cooler 70 which produces cold direct reduction iron.

The reduction gas 72 after leaving the RHF 34 enters a flue gas conditioner 74. Conditioned flue gas 76 is transferred to a heat exchanger 78 which is also feed by combustion air 80 through fan 82. Heat Exchanger 78 serves to warm combustion air 78 into preheated oxygen 54. After the conditioned flue gas 76 leaves the heat exchanger it is sent to the appropriate pollution control equipment 84. Pollution control equipment is comprised of scrubbers, electrostatic precipitators, cyclones, and bag houses. Treated gas 86 is drawn out of the pollution control equipment 84 by a fan 88 and delivered to a stack 90 for discharge to the atmosphere 92.

SUMMARY OF THE ACHIEVEMENT OF THE OBJECTS OF THE INVENTION

From the foregoing, it is readily apparent that we have invented an improved method and apparatus for of achieving rapid and efficient reduction of iron oxide in a rotary hearth furnace. Advantages of this method are: improved atmosphere control at the hearth level to avoid oxidation of metallic iron; highly metallized iron can be produced having lower carbon content; energy efficiency is improved by using sensible heat in the metallized compacts to preheat part of the fuel for the rotary hearth furnace.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for producing metal from direct reduced iron from dry compacts of iron oxide and particulate carbonaceous material in a rotary hearth furnace, comprising:
   a. means for mixing iron oxide fines and particulate carbonaceous material and forming dry compacts;
   b. a rotary hearth furnace having a generally flat hearth surface for receiving the dry compacts;
   c. means for feeding the dry compacts in no more than two layers on the surface of said hearth;
   d. means for heating, reducing, and sintering said dry compacts on said hearth to form a reduced product;
   e. means for infecting a coolant in the vicinity of said compacts;
   f. means for discharging said reduced compacts from said rotary hearth furnace; and
   g. means intermediate said feeding means and said discharge means for removing flue gas from said rotary hearth furnace.

2. Apparatus according to claim 1, further comprising means for partially cooling the compacts while discharging them from the hearth.

3. Apparatus according to claim 1, wherein said means for feeding said compacts one to two layers deep onto the hearth comprises at least one vertical feed pipe having an adjustable gate, or leveler, having a lower edge to control the thickness of the layer.

4. Apparatus according to claim 1, wherein said means for discharging of compacts from the hearth comprises at least one helical screw.

5. Apparatus according to claim 1, wherein said means for discharging of compacts from the hearth comprises at least one plow.

6. Apparatus according to claim 1, further comprising a water-cooled probe for collecting a gas sample less than one inch above the surface of said compacts immediately prior to their discharge from said hearth, whereby the levels of carbon monoxide and oxygen in said gas sample are monitored for purposes of product quality control and/or optimization of productivity.

* * * * *

UNITED STATES PATENT AND TRADEMARK OFFICE
CERTIFICATE OF CORRECTION

PATENT NO. : 5,885,521
DATED : March 23, 1999
INVENTOR(S) : Meissner et al.

It is certified that error appears in the above-identified patent and that said Letters Patent is hereby corrected as shown below:

<u>Column 8,</u>
Line 24, change the word "infecting" to -- injecting --.

Signed and Sealed this

Twenty-third Day of April, 2002

Attest:

JAMES E. ROGAN
*Director of the United States Patent and Trademark Office*

*Attesting Officer*